May 27, 1947. D. M. GIVEN, JR 2,421,194
SUCTION ACTUATED MOTOR FOR WINDSHIELD WIPERS
Filed Jan. 29, 1945 2 Sheets-Sheet 1

INVENTOR.
David M. Given Jr.
BY Lancaster, Allwine and Rommel
ATTORNEYS.

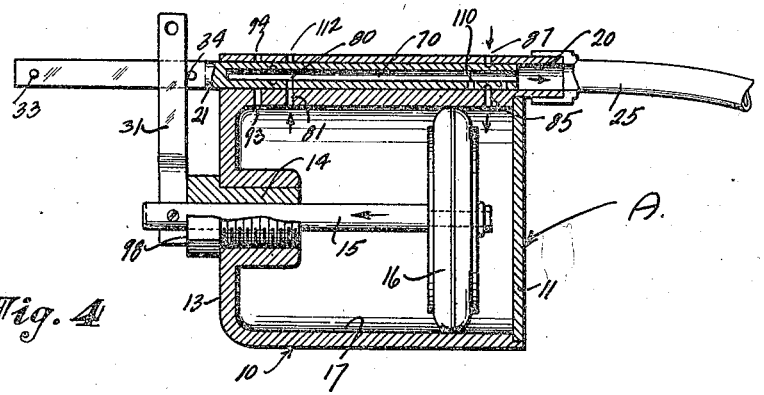

Patented May 27, 1947

2,421,194

UNITED STATES PATENT OFFICE 2,421,194

SUCTION ACTUATED MOTOR FOR WINDSHIELD WIPERS

David M. Given, Jr., Newark, N. J.

Application January 29, 1945, Serial No. 575,045

4 Claims. (Cl. 121—164)

1

This invention relates to improvements in windshield wiping mechanism.

The primary object of this invention is the provision of an improved windshield wiping mechanism, particularly well adapted for automotive vehicles having an improved vacuum actuated motor for control thereof.

A further object of this invention is the provision of a simplified type of vacuum actuated motor for windshild wiper operating mechanisms.

A further object of this invention is the provision of an improved vacuum actuated motor adapted to be used in connection with the operation of such mechanisms as windshield wipers having means for parking said wipers.

Other objects and advantages of the invention will be apparent from the following detailed description.

In the accompanying drawings, forming a part of this specification, and wherein similar reference characters designate corresponding parts—

Figure 4 is a fragmentary longitudinal cross sectional view taken thru the improved vacuum actuated motor showing, by arrow, the piston thereof about to move to the left; the other arrows indicating the line of suction and admission of air pressure to the motor.

Figure 5 is a fragmentary longitudinal cross sectional view taken thru the improved vacuum actuated motor showing, by arrow, the piston thereof about to move to the right; the other arrows indicating the line of suction and admission of air pressure of the motor.

Figure 6 is a view of the parts in the relative position shown in Figure 5 but in addition showing the valve tube in full side elevation, and the manually operated lever by means of which the motor may be parked.

Figure 1:
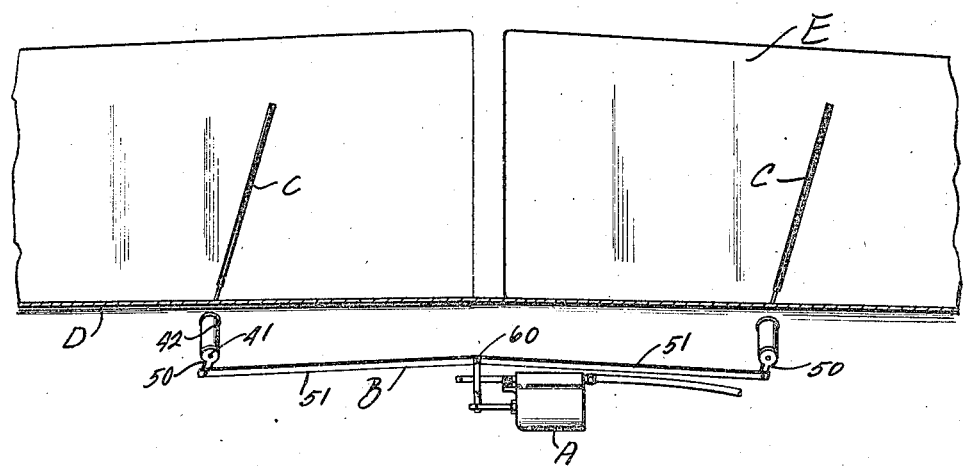
Figure 1 is a fragmentary view, partly in section, showing the relation of the vacuum actuated motor with respect to the windshield squeegee wiper and the linkage connecting the same to the motor.

In the drawings, wherein for the purpose of illustration is shown only a preferred embodiment of the invention—

The letter A may generally designate the improved vacuum actuated motor which may, thru suitable linkage B, be connected to squeegee or other type of windshield wiper C operatively mounted upon automobile cowling D. for operation over a windshield E.

I do not restrict the use of my vacuum actuated motor to use in connection with operating windshield mechanism. The motor preferably includes a cylinder 10 having a removable end wall 11 and an opposite end wall 13 provided with a suitable detachable gland 14 wherein a piston rod 15 is slidable. The rod 15 has a suitable piston 16 operating in the chamber 17 of the cylinder 10. Preferably integral with the cylinder casing 10 there is an extension providing a valve receiving passageway 20 paralleling the chamber 17, receiving therein the hollow slide valve 21. The passageway 20 is contiguous with an extension 23 at one end of the cylinder adapted to receive a nut 24 by means of which to attach a flexible line 25 leading to a suitable vacuum pump, and obviously for the purpose of creating a partial vacuum in the passageway 20 and the hollow valve stem or tube 21, in accordance with features to be subsequently described.

The piston shaft or rod 15 externally of the casing is provided with a detachable laterally extending arm 31 adapted to cooperate in the space between studs or pins 33 and 34 mounted in definitely spaced relation upon the external end of the valve tube 21.

Before further describing the port arrangement of the vacuum actuated motor, reference will be made to the specific connection of the said motor with the windshield wiping mechanism. Squeegee type wipers C may be mounted at 40 upon suitable right angle shafts 41 bearing in sleeves 42 mounted upon the cowling or other foundation D and preferably having auxiliary support at 44. The shafts 41 have crank arms 50 at the inner ends thereof behind the cowling, connected by suitable rods 51 to the apertured end of the aforesaid motor arm 31, at 60, shown in Figure 1 of the drawings. Obviously, reciprocation of the piston rod 15 will, thru this linkage, cause oscillation of the wipers over the windshield.

Referring again to the vacuum actuated motor, the slidable valve 21 has a passageway 70 therein open to the tube 25.

As the arm 31 moves to the right of the cylinder 10 and engages the pin 34 for shifting the valve sleeve 21 into the position shown in Figure 4, suction in the line 25 will be communicated thru the passageway 70 and thru the port 80 of the sleeve—thru the port 81 in the cylinder, into the chamber 17 behind the piston 16. The piston 16 will then start to move to the left in the direction indicated by the arrow in Figure 4. Air will enter the chamber 10 at the front of the piston thru a port 85 in the cylinder 10; annular duct groove 86 surrounding the valve tube 21, and the duct 87, and will be drawn, as indicated by the arrow in Figure 4, into the cylinder chamber 17 at the front of the piston head 16. There will therefore be no resistance to movement of the piston. Action will continue to move the piston head 16 until it strikes the stop surface 90 indicated in Figure 5 of the drawings, at which time the arm 31 will have moved against the stud 33 and shifted the valve tube 21 to the position shown in Figure 5. The suction in the passageway 70 will then be created in the cylinder thru a port 91 in the tube 21 and thru the port 85 to the chamber 17 in front of the piston. The piston 16 will now start to move in the direction indicated by the arrow in Figure 5. Behind the piston air will be supplied to the chamber 17 of the cylinder thru cylinder ports 93 and 94 and annular duct groove 95 in the cylinder tube 21. Thus, there will be no resistance to movement of the piston to the right, or in the direction indicated by the arrow. The piston rod will continue to move to the right until the arm 31 strikes the gland surface 98, shown in Figure 4, at which time the ports will align to the position shown in Figure 4 and the piston will then again start to move to the left. This reciprocation continues so long as any suction tends to create a partial vacuum in the cylinder.

Figure 2:
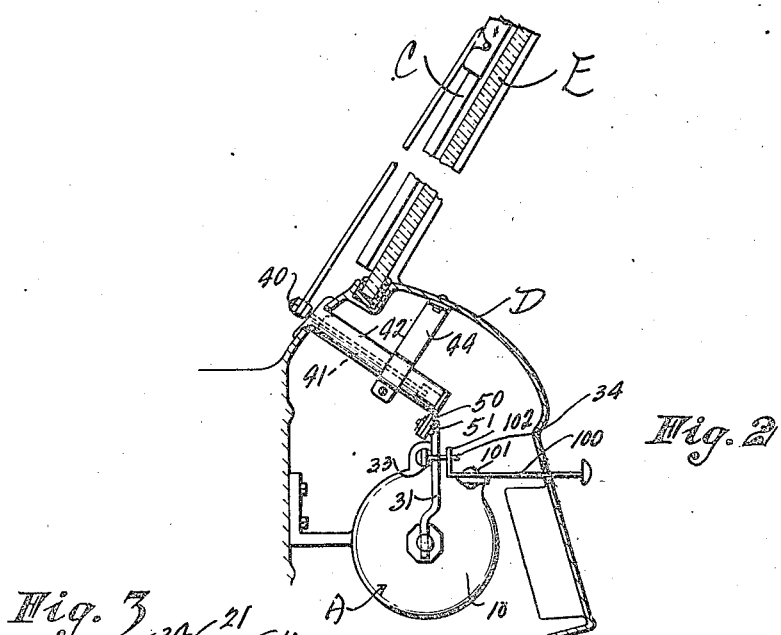
Figure 2 is a fragmentary vertical cross sectional view taken through a windshield and its adjacent cowl, showing the improved motor and the wiper mechanism which actuates the same.
Figure 3:
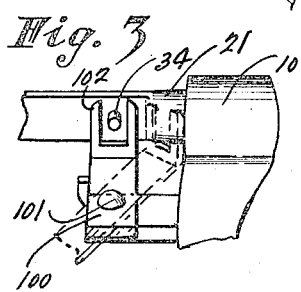
Figure 3 is a fragmentary view showing a manually actuated leverage mechanism by means of which to park the vacuum actuated motor.

I provide lever means to position the valve sleeve 21 in an inoperative position. This means consists of a manually operated lever 100 pivoted at 101 upon the cylinder casing 10; the lever 100 extending thru the cowling and the dash of the latter being suitably slotted (not shown) to permit lateral movement of the lever. The lever 100 has a bifurcated crank end 102 adapted to operate upon the pin 34 above described, at a point shown in Figure 2; not interferring with the arm 31. The normal position of the arm 100 to permit the above described reciprocatory action of the piston mechanism is shown in full lines in Figures 3 and 6. Movement of this lever 100 to the right, to the dotted position shown in Figure 3, shifts the valve sleeve 21 thru the pin 34 to align a port 110 with the port 85 above described, so that suction is created in the fore part of the cylinder chamber 17 tending to draw the piston 16 to the right. This will align the annular duct groove 95 with the port 81 above described at a point to the rear of the piston and thru a port 112 air will enter the cylinder chamber behind the piston. So long as the lever 100 is in this position the motor will be parked.

From the foregoing description of this invention it is apparent that a suction actuated motor has been provided with relatively few moving parts and in which the duct arrangement admits of efficient operation without any appreciable need for maintenance expenditures.

Various changes in the shape, size and arrangement of parts may be made to the form of invention herein shown and described, without departing from the spirit of the invention or the scope of the following claims.

I claim:

1. A suction actuated motor comprising a cylinder, a piston slidable in the cylinder, a suction regulating valve, reciprocation means connecting the piston with the suction regulating valve to shift the position of the latter at the extremes of movement of the piston, duct means in the cylinder and valve for shifting the suction from one side of the piston to the other as the piston approaches an extreme position at either end of its movement, duct means for admitting air at the opposite side of the piston within the cylinder at the change of suction in the cylinder from one side of the piston to the other, auxiliary duct means on the valve for transferring suction to one side of the piston only at a parking position of the valve, and means to move the valve to such position.

2. In a suction actuated motor for operation of windshield wipers and the like, the combination of a cylinder having a chamber therein, a piston slidable in the cylinder chamber, a piston rod connecting with the piston and slidably mounted in the cylinder and extending externally thereof, a slidable hollow valve sleeve mounted upon the cylinder for movement in a line parallel to the line of movement of the piston, means for creating suction within the valve sleeve, duct means in the cylinder and on said sleeve for creating suction at each side of the piston within the cylinder chamber, duct means on the valve sleeve and cylinder for admitting atmospheric air to the cylinder chamber at each side of the piston, means connected with the piston rod and actuating said valve sleeve for aligning said duct means so that at the extreme ends of movement of the piston within the cylinder suction will be created in the cylinder chamber at the opposite side of the piston and atmospheric air admitted to the cylinder chamber at the opposite side of the piston to which the suction is connected, and other means for moving the valve sleeve to a parking position by admitting atmospheric air at one side of the piston within the cylinder and connect suction with the cylinder at the opposite side of said piston.

3. In a suction actuated motor the combination of a cylinder having a chamber therein, a piston slidable in said chamber, a piston rod connected with the piston and slidably mounted on the cylinder and extending externally thereof, a passageway in the cylinder paralleling the piston chamber, means for creating suction in said passageway, a hollow valve sleeve slidable in said passageway, said hollow valve sleeve having a passageway open to said suction passageway by the cylinder, said cylinder having duct means therein open to the cylinder and open to said passageway of the cylinder at opposite sides of the piston beyond the extreme positions of movement of the piston within the cylinder, said cylinder furthermore having other duct means in the same relative position as the ducts above mentioned open to the atmosphere and to said passageway of the cylinder, said valve sleeve having transverse ducts therethru open to the passageway thereof and to the ducts of the cylinder aforesaid whereby to connect the suction in the passageway of the cylinder to the cylinder chamber via the first mentioned cylinder ducts, said valve stem having annular grooves externally therein in position to align with the ducts of the cylinder passageway open to the cylinder chamber and to the atmosphere, and means connecting the piston with the valve sleeve whereby at each extreme of movement of the piston suction will be created in the cylinder chamber at the opposite side of the piston and atmospheric air admitted to the other side of the piston in the cylinder, said valve sleeve having a parking position port therethru open to the passageway thereof, and means for aligning said port with one of the cylinder ports aforesaid to create suction in the cylinder chamber at one side of the piston only and render the motor inoperative.

4. In a suction actuated motor the combination of a cylinder having a chamber therein, a piston slidable in the chamber, a piston rod connected with the piston slidably mounted on the cylinder and extending externally thereof, a passageway in the cylinder paralleling the piston movement, means for creating suction in said passageway, a hollow valve sleeve slidable in said passageway having a passageway therein open to the suction passageway of the cylinder, said cylinder having ducts transversely therein open to the passageway of the cylinder aforesaid and to the chamber of the cylinder at opposite sides of the extreme positions of movement of the piston within the cylinder, said cylinder having other ducts therein in the same planes of movement as the ducts above mentioned open to the atmosphere and to the passageway of the cylinder, said valve sleeve having transverse ducts therein open to the passageway of the sleeve so relatively positioned as to alternately align with the ducts of the cylinder open to the cylinder chamber upon movement of the piston from one extreme position to the other, said valve sleeve having annular grooves externally therein positioned to align with the ducts of the cylinder passageway open to the cylinder chamber and to the atmosphere, said valve sleeve extending externally of the cylinder and having a pair of abutments thereon, means on the piston externally of the cylinder for engaging said abutments to shift the position of the valve at the extremes of movement of the piston for changing the suction upon the piston in the cylinder from one side of the piston to the other and to admit atmospheric air to the opposite side of the piston, said valve sleeve having a parking position port therein open to the passageway thereof, and a lever externally of the cylinder engaging said valve to permit shifting the same to align said last mentioned port with one of the cylinder ports open to the cylinder chamber.

DAVID M. GIVEN, Jr.

REFERENCES CITED

The following references are of record in the file of this patent:

UNITED STATES PATENTS

| Number | Name | Date |
|---|---|---|
| 12,592 | Guild et al. | Mar. 27, 1855 |
| 140,309 | Rogers | June 24, 1873 |
| 1,781,190 | Nilson et al. | Nov. 11, 1930 |
| 2,286,026 | Towler et al. | June 9, 1942 |
| Re. 19,202 | Phillips, Jr. | June 5, 1934 |

Certificate of Correction

Patent No. 2,421,194.  May 27, 1947.

DAVID M. GIVEN, JR.

It is hereby certified that errors appear in the printed specification of the above numbered patent requiring correction as follows: Column 4, line 18, claim 2, for the word "connecting" read *connected*; line 51, claim 3, for "by" read *of*; and that the said Letters Patent should be read with these corrections therein that the same may conform to the record of the case in the Patent Office.

Signed and sealed this 21st day of October, A. D. 1947.

[SEAL]

THOMAS F. MURPHY,
*Assistant Commissioner of Patents.*